US007172791B2

(12) United States Patent
Treadway et al.

(10) Patent No.: US 7,172,791 B2
(45) Date of Patent: *Feb. 6, 2007

(54) LUMINESCENT NANOPARTICLES AND METHODS FOR THEIR PREPARATION

(75) Inventors: Joseph A. Treadway, Fremont, CA (US); Donald A. Zehnder, San Carlos, CA (US); Marc D. Schrier, El Granada, CA (US)

(73) Assignee: Invitrogen Corp., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/985,249

(22) Filed: Nov. 9, 2004

(65) Prior Publication Data

US 2006/0057382 A1   Mar. 16, 2006

Related U.S. Application Data

(63) Continuation of application No. 10/198,635, filed on Jul. 17, 2002, now Pat. No. 6,815,064.

(60) Provisional application No. 60/306,787, filed on Jul. 20, 2001.

(51) Int. Cl.
*B05D 7/00* (2006.01)
*B05D 3/02* (2006.01)

(52) U.S. Cl. ............... 427/215; 427/216; 427/217; 427/314; 427/318; 427/319

(58) Field of Classification Search ............... 427/215, 427/216, 217, 314, 318, 319
See application file for complete search history.

(56) References Cited

U.S. PATENT DOCUMENTS

| | | | |
|---|---|---|---|
| 6,207,229 B1 | 3/2001 | Bawendi et al. | |
| 6,225,198 B1 | 5/2001 | Alivisatos et al. | |
| 6,306,736 B1 | 10/2001 | Alivisatos et al. | |
| 6,322,901 B1 | 11/2001 | Bawendi et al. | |
| 6,586,095 B2 | 7/2003 | Wang et al. | |
| 6,682,596 B2 | 1/2004 | Zehnder et al. | |
| 6,685,986 B2 * | 2/2004 | Oldenburg et al. | 427/214 |
| 6,815,064 B2 * | 11/2004 | Treadway et al. | 428/403 |
| 2003/0017264 A1 * | 1/2003 | Treadway et al. | 427/212 |
| 2006/0057382 A1 * | 3/2006 | Treadway et al. | 428/403 |

FOREIGN PATENT DOCUMENTS

WO   WO 99/26299   5/1999

OTHER PUBLICATIONS

Dabbousi et al. (1997), "(CdSe)ZnS Core-Shell Quantum Dots: Synthesis and Characterization of a Size Series of Highly Luminescent Nanocrystallites," *J. Phys. Chem. B* 101(46):9463-9475.

(Continued)

*Primary Examiner*—H. Thi Le

(57) ABSTRACT

Methods for synthesizing luminescent nanoparticles and nanoparticles prepared by such methods are provided. The nanoparticles are prepared by a method in which an additive is included in the reaction mixture. The additive may be a Group 2 element, a Group 12 element, a Group 13 element, a Group 14 element, a Group 15 element, or a Group 16 element. In additions, a luminescent nanoparticle is provided that comprises a semiconductive core surrounded by an inorganic shell, an interfacial region and an additive present in the interfacial region or both the interfacial region and the shell.

20 Claims, 5 Drawing Sheets

OTHER PUBLICATIONS

Danek et al. (1996), "Synthesis of Luminescent Thin-Film CdSe/ZnSe Quantum Dot Composites Using CdSe Quantum Dots Passivated with an Overlayer of ZnSe," *Chem. Mater.* 8(1):173-180.

Hines et al. (1996), "Synthesis and Characterization of Strongly Luminescing ZnS-Capped CdSe Nanocrystals," *J. Phys. Chem.* 100(2):468-471.

Kortan et al. (1990), "Nucleation and Growth of CdSe on ZnS Quantum Crystallite Seeds, and Vice Versa, in Inverse Micelle Media," *J. Am. Chem. Soc.* 112(4):1327-1332.

Peng et al. (1997), "Epitaxial Growth of Highly Luminescent CdSe/CdS Core/Shell Nanocrystals with Photostability and Electronic Accessibility," *J. Am. Chem. Soc.* 119(30):7019-7029.

Peng et al. (1998), "Kinetics of II-VI and III-V Colloidal Semiconductor Nanocrystal Growth: 'Focusing' of Size Distributions," *J. Am. Chem. Soc.* 120(21):5343-5344.

Peng et al. (2001), "Formation of High-Quality CdTe, CdSe, and CdS Nanocrystal Using CdS as Precursor," *J. Am. Chem. Soc.* 123(1):183-184.

Peng et al. (2001), "Mechanisms of the Shape Evolution of CdSe Nanocrystals," *J. Am. Chem. Soc.* 123(7):1389-1395.

Qu et al. (2001), "Alternative Routes toward High Quality CdSe Nanocrystls," *Nano Letters* 1(6):333-337.

Tian et al. (1996), "Coupled Composite CdS-CdSe and Core-Shell Types of (CdS)CdSe and (CdSe)CdS Nanoparticles," *J. Phys. Chem.* 100(21):8927-8939.

Youn et al. (1988), "Dihexadecyl Phosphate, Vesicle-Stabilized and In Situ Generated Mixed CdS and ZnS Semiconductor Particles. Preparation and Utilization for Photosensitized Charge Separation and Hydrogen Generation," *J. Phys. Chem.* 92(22):6320-6327.

* cited by examiner

LUMINESCENT NANOPARTICLES AND METHODS FOR THEIR PREPARATION

CROSS-REFERENCE TO RELATED APPLICATIONS

This application is a continuation of application Ser. No. 10/198,635, filed Jul. 17, 2002 now U.S. Pat. No. 6,815,064, which claims priority under 35 U.S.C. §119(e)(1) to U.S. Provisional Application No. 60/306,787, filed Jul. 20, 2001, both applications of which are incorporated by reference herein in their entirety.

TECHNICAL FIELD

The present invention relates generally to luminescent nanoparticles and methods for their preparation.

BACKGROUND OF THE INVENTION

Semiconductor nanoparticles, such as CdSe crystals with diameters in the range of 1–7 nm, are important new materials that have a wide variety of applications, particularly in the biological arena. Of the many unique properties of these materials, the photophysical characteristics are some of the most useful. Specifically, these materials can display intense luminescent emission that is particle size-dependent and particle composition-dependent, can have an extremely narrow bandwidth, and can be environmentally insensitive; such emissions can be efficiently excited with electromagnetic radiation having a shorter wavelength than the highest energy emitter in the material. These properties allow for the use of semiconductor nanocrystals as ultra-sensitive luminescent reporters of biological states and processes in highly multiplexed systems.

Some bare nanocrystals, i.e., nanocrystal cores, do not display sufficiently intense or stable emission, however, for these applications. In fact, the environments required for many applications can actually lead to the complete destruction of these materials. A key innovation that increases the usefulness of the nanocrystals is the addition of an inorganic shell over the core. The shell is composed of a material appropriately chosen to be preferably electronically insulating (through augmented redox properties, for example), optically non-interfering, chemically stable, and lattice-matched to the underlying material. This last property is important, since epitaxial growth of the shell is often desirable. Furthermore, matching the lattices, i.e., minimizing the differences between the shell and core crystallographic lattices, minimizes the likelihood of local defects, the shell cracking or forming long-range defects.

Considerable resources have been devoted to optimizing nanoparticle core synthesis. Much of the effort has been focused on optimization of key physiochemical properties in the resultant materials. For example, intense, narrow emission bands resulting from photo-excitation are commonly desirable. Physical factors impacting the emission characteristics include the crystallinity of the material, core-shell interface defects, surface imperfections or "traps" that enhance nonradiative deactivation pathways (or inefficient radiative pathways), the gross morphologies of the particles, and the presence of impurities. The use of an inorganic shell has been an extremely important innovation in this area, as its use has resulted in dramatic improvements in the aforementioned properties and provides improved environmental insensitivity, chemical and photochemical stability, reduced self-quenching characteristics, and the like.

Shell overcoating methodologies have, to date, been relatively rudimentary. Shell composition, thickness, and quality (e.g., crystallinity, particle coverage) have been poorly controlled, and the mechanism(s) of their effects on particle luminescence poorly understood. The impact of overcoating on underlying luminescence energies has been controlled only sparsely through choice and degree of overcoating materials based on a small set of criteria.

Hines et al. (1996) "Synthesis and Characterization of Strongly Luminescing ZnS-Capped CdSe Nanocrystals," *J. Phys. Chem.* 100:468 describe the preparation of a ZnS-capped CdSe nanocrystal that exhibits a significant improvement in luminescence yields: up to 50% quantum yield at room temperature. Unfortunately, the quality of the emitted light remains unacceptable, due to the large size distribution (12–15% rms) of the core of the resulting capped nanocrystals. The large size distribution results in light emission over a wide spectral range. In addition, the reported preparation method does not allow control of the particle size obtained from the process and hence does not allow control of the color (i.e., emitted wavelength).

Danek et al. report the electronic and chemical passivation of CdSe nanocrystals with a ZnSe overlayer (*Chem. Materials* 8:173, 1996). Although it might be expected that such ZnSe-capped CdSe nanocrystals would exhibit as good or better quantum yield than the ZnS analogue, due to the improved unit cell matching with ZnSe, the resulting material remained only weakly luminescent ($\leq 0.4$% quantum yield).

Other references disclosing core-shell-type luminescent nanoparticles include Dabbousi et al. (1997) "(CdSe)ZnS Core/shell Quantum Dots: Synthesis and Characterization of a Size Series of Highly Luminescent Nanocrystallites," *J. Phys. Chem. B* 101:9463, Peng et al. (1997) "Epitaxial Growth of Highly Luminescent CdSe/CdS Core/Shell Nanocrystals with Photostability and Electronic Accessibility," *J. Am. Chem. Soc.* 119:7019, and Peng et al. (1998) "Kinetics of II–VI and III–V Colloidal Semiconductor Nanocrystal Growth: Focusing of Size Distributions," *J. Am. Chem. Soc.* 120:5343. Issued U.S. patents relating to core-shell nanoparticles include U.S. Pat. Nos. 6,207,229 and 6,322,901 to Bawendi et al. However, each of these references fails to provide any correction for structural mismatches in the lattice structures of the core and the shell.

Described herein is a method that provides, via the use of a reaction additive, a core-shell material displaying superior chemical, photochemical, and/or photophysical properties when compared to core-shell materials prepared by traditional methods. The method may produce shells that are better wed to the underlying cores. The method may also produce shells that are more electronically insulating to the core exciton. Additionally, this method may facilitate the controllable deposition of shell material onto the cores.

SUMMARY OF THE INVENTION

Accordingly, it is a primary object of the invention to address the above-described need in the art by providing a luminescent nanoparticle prepared according to a method comprising providing an isolated semiconductive core, admixing the core with first and second shell precursors, a solvent, and an additive. The additive may comprise a Group 2 element, a Group 12 element, a Group 13 element, a Group 14 element, a Group 15 element, a Group 16 element or Fe, Nb, Cr, Mn, Co, Cu, and Ni. The reaction dispersion thus formed is heated to a temperature and for a period of time sufficient to induce formation of an inorganic shell on the semiconductive core.

It is yet another object of the invention to provide a method of preparing a luminescent nanoparticle. In the method, an isolated semiconductive core is provided and admixed with first and second shell precursors, a solvent, and an additive. The resulting reaction dispersion is heated to a temperature and for a period of time sufficient to induce formation of an inorganic shell on the semiconductive core.

It is still another object of the invention to provide a method of preparing a luminescent nanoparticle. In the method, first and second precursors are injected into a first solvent system that is maintained at a temperature sufficient to induce homogeneous nucleation. This nucleation results in the formation of a monodisperse population of individual semiconductive cores comprised of a first semiconductive material having a first lattice structure. Next, at least a portion of the monodisperse population of individual cores is used to form a core dispersion that also comprises a second solvent and potentially an additive precursor. The second solvent system may be the same as the first solvent system. First and second shell precursors (and potentially an additive precursor) are then added to the core solution, resulting in the formation of a shell on each of the individual cores, with an interfacial region located between the semiconductive core and the inorganic shell. The interfacial region is comprised of elements of the semiconductive core, the shell, and potentially an additive, as described above. The shell is comprised of a second material having a second lattice structure, and may optionally also comprise the additive.

It is another object of the invention to provide a luminescent nanoparticle comprised of a semiconductive core, an inorganic shell surrounding the semiconductive core, and an interfacial region therebetween. The semiconductive core is comprised of a first semiconductive material having a first lattice structure. The shell is comprised of a second inorganic material having a second lattice structure. The interfacial region can be comprised of components of the semiconductive core and the shell and an additional additive that might be capable of incorporation into both the first and second lattice structures, i.e., the core and the shell, respectively.

The core may be comprised of (a) a first element selected from Groups 2, 12, 13 or 14 of the Periodic Table of the Elements and a second element selected from Group 16 of the Periodic Table of the Elements, (b) a first element selected from Group 13 of the Periodic Table of the Elements and a second element selected from Group 15 of the Periodic Table of the Elements, or (c) a Group 14 element. Examples of materials suitable for use in the semiconductive core include, but are not limited to, MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, HgTe, $Al_2S_3$, $Al_2Se_3$, $Al_2Te_3$, $Ga_2S_3$, $Ga_2Se_3$, GaTe, $In_2S_3$, $In_2Se_3$, InTe, SnS, SnSe, SnTe, PbS, PbSe, PbTe, AlP, AlAs, AlSb, GaN, GaP, GaAs, GaSb, InN, InP, InAs, InSb, BP, Si, and Ge, and ternary and quaternary mixtures, compounds, and solid solutions thereof. Particularly preferred semiconductive core materials are CdSe, CdTe, CdS, ZnSe, InP, InAs, and PbSe, and mixtures and solid solutions thereof.

The inorganic shell may be comprised of (a) a first element selected from Groups 2, 12, 13 or 14 of the Periodic Table of the Elements and a second element selected from Group 16 of the Periodic Table of the Elements, (b) a first element selected from Group 13 of the Periodic Table of the Elements and a second element selected from Group 15 of the Periodic Table of the Elements, or (c) a Group 14 element. Suitable second materials include, but are not limited to, MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, SnO, $SnO_2$, SnS, SnSe, SnTe, PbO, $PbO_2$, PbS, PbSe, PbTe, AlN, AlP, AlAs, AlSb, GaN, GaP, GaAs, GaSb, InN, BP, and ternary and quaternary mixtures and solid solutions thereof. Preferred second materials are CdSe, CdS, ZnSe, ZnS, CdO, ZnO, $SiO_2$, $Al_2O_3$, and ZnTe. Optionally, an organic or other overcoat that is selected to provide compatibility with a dispersion medium may surround the shell.

The additive is generally comprised of a material selected from the group consisting of Group 2 of the Periodic Table of the Elements, Group 12 of the Periodic Table of the Elements, Group 13 of the Periodic Table of the Elements, Group 14 of the Periodic Table of the Elements, Group 15 of the Periodic Table of the Elements, and Group 16 of the Periodic Table of the Elements, as well as Fe, Nb, Cr, Mn, Co, Cu, and Ni, and may also be found in the semiconductive core. The additive, which might be present in the interfacial region, may also be present throughout the shell. If present in the shell, the additive may be evenly distributed in the shell or may be present in a decreasing concentration in an outward direction from the semiconductive core. In some cases, the additive is selected to provide the interfacial region with a crystalline structure that serves as a transitional lattice structure between the lattice structure of the core material and the lattice structure of the shell material.

In one preferred embodiment, the semiconductive core is CdSe or CdTe, the inorganic shell is ZnS and the additive is Cd. In another preferred embodiment, the semiconductive core is CdSe or CdTe, the inorganic shell is CdS and the additive is Zn.

Additional objects, advantages, and novel features of the invention will be set forth in part in the description that follows, and in part will become apparent to those skilled in the art upon examination of the following, or may be learned by practice of the invention.

DETAILED DESCRIPTION OF INVENTION

Figure 1:
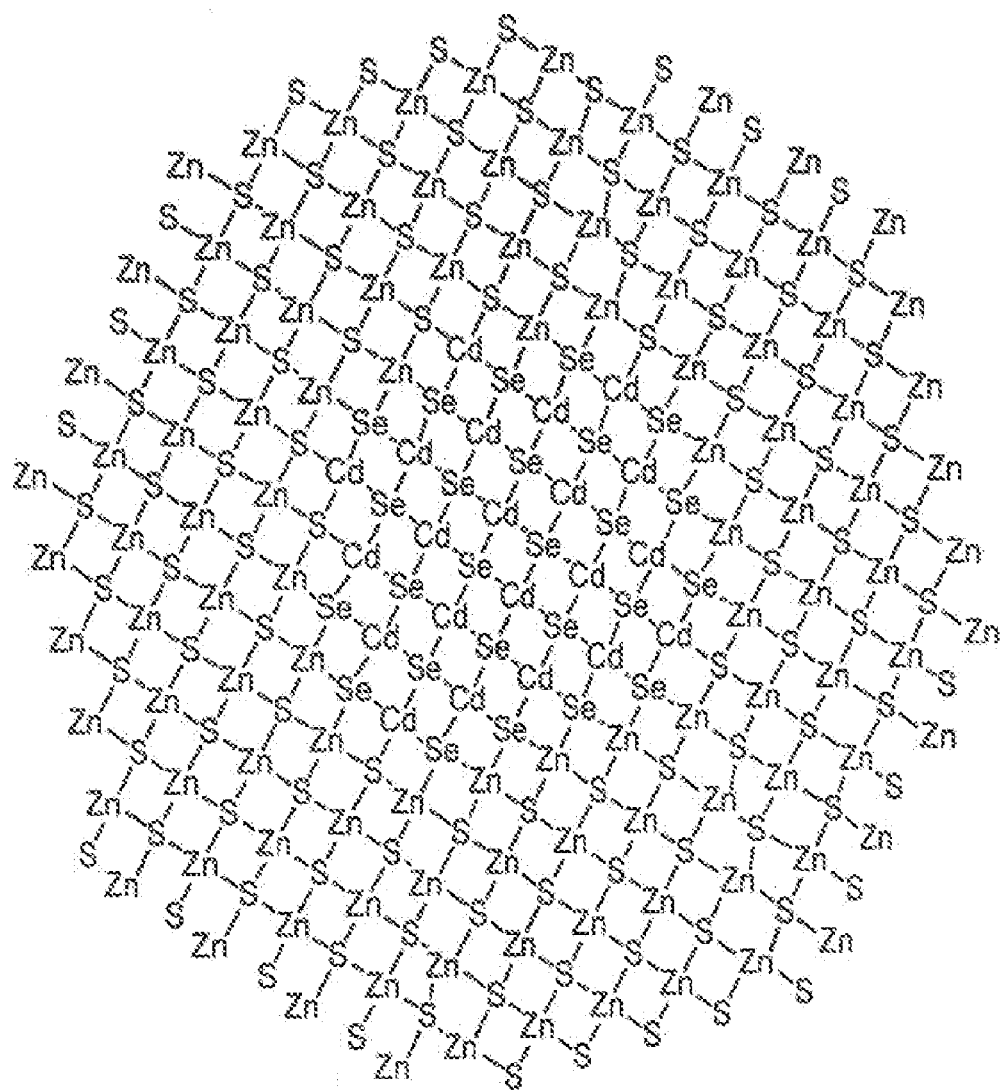
FIG. 1 depicts a simple 2-D representation of a conventional core-shell structure.

Overview and Definitions:

Before describing the present invention in detail, it is to be understood that unless otherwise indicated this invention is not limited to specific nanoparticle materials or manufacturing processes, as such may vary. It is also to be understood that the terminology used herein is for the purpose of describing particular embodiments only, and is not intended to be limiting.

It must be noted that, as used herein, the singular forms "a," "an," and "the" include plural referents unless the context clearly dictates otherwise. Thus, for example, "a nanoparticle" encompasses not only a single nanoparticle but also two or more nanoparticles, and the like.

In describing and claiming the present invention, the following terminology will be used in accordance with the definitions set out below.

The term "nanoparticle" refers to a particle, generally a semiconductive or metallic particle, having a diameter in the range of about 1 nm to about 1000 nm, preferably in the range of about 2 nm to about 50 nm, more preferably in the range of about 2 nm to about 20 nm.

The term "semiconductive core" refers to a core nanoparticle as described herein that is composed of an inorganic semiconductive material, a mixture or solid solution of inorganic semiconductive materials, or an organic semiconductive material. The term "inorganic shell" refers to a shell as described herein that is composed of an inorganic material, or a mixture or solid solution of inorganic materials. Preferably, the inorganic shell is composed of an inorganic semiconductive material or an insulating material.

The terms "semiconductor nanocrystal," "quantum dot," and "Qdot™ nanocrystal" are used interchangeably herein to refer to semiconductor nanoparticles composed of a crystalline inorganic material that is luminescent (i.e., they are capable of emitting electromagnetic radiation upon excitation), and include an inner core of one or more first semiconductor materials that is contained within an overcoating or "shell" of a second inorganic material. A semiconductor nanocrystal core surrounded by an inorganic shell is referred to as a "core-shell" semiconductor nanocrystal. The surrounding shell material will preferably have a bandgap energy that is larger than the bandgap energy of the core material, and may be chosen to have an atomic spacing close to that of the core material. Suitable semiconductor materials for the core and/or shell include, but are not limited to, the following: materials comprised of a first element selected from Groups 2 or 12, 13, or 14 of the Periodic Table of the Elements and a second element selected from Group 16 (e.g., ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like); materials comprised of a first element selected from Group 13 of the Periodic Table of the Elements and a second element selected from Group 15 (GaN, GaP, GaAs, GaSb, InN, InP, InAs, InSb, BP, and the like); materials comprised of a Group 14 element (Ge, Si, and the like); materials such as PbS, PbSe, and the like; and alloys, solid solutions, and mixtures thereof. As used herein, all references to the Periodic Table of the Elements and groups thereof is to the new IUPAC system for numbering element groups, as set forth in the Handbook of Chemistry and Physics, 81$^{st}$ Edition (CRC Press, 2000).

The term "solid solution" is used herein to refer to a compositional variation that is the result of the replacement of an ion or ionic group for another ion or ionic group, e.g., CdS in which some of the Cd atoms have been replaced with Zn. This is in contrast to a "mixture," a subset of which is an "alloy," which is used herein to refer to a class of matter with definite properties whose members are composed of two or more substances, each retaining its own identifying properties.

By "luminescence" is meant the process of emitting electromagnetic radiation (e.g., light) from an object. Luminescence results when a system undergoes a transition from an excited state to a lower energy state, with a corresponding release of energy in the form of a photon. These energy states can be electronic, vibrational, rotational, or any combination thereof. The transition responsible for luminescence can be stimulated through the release of energy stored in the system chemically, kinetically, or added to the system from an external source. The external source of energy can be of a variety of types including chemical, thermal, electrical, magnetic, electromagnetic, or physical, or any other type of energy source capable of causing a system to be excited into a state higher in energy than the ground state. For example, a system can be excited by absorbing a photon of light, by being placed in an electrical field, or through a chemical oxidation-reduction reaction. The energy of the photons emitted during luminescence can be in a range from low-energy microwave radiation to high-energy X-ray radiation. Typically, luminescence refers to electromagnetic radiation in the range from UV to IR radiation, and usually refers to visible electromagnetic radiation (i.e., light).

The term "monodisperse" refers to a population of particles (e.g., a colloidal system) wherein the particles have substantially identical size and shape. For the purpose of the present invention, a "monodisperse" population of particles means that at least about 60% of the particles, preferably about 75% to about 90% of the particles, fall within a specified particle size range. A population of monodisperse particles deviates less than 10% rms (root-mean-square) in diameter and preferably less than 5% rms.

The phrase "one or more sizes of nanoparticles" is used synonymously with the phrase "one or more particle size distributions of nanoparticles." One of ordinary skill in the art will realize that particular sizes of nanoparticles, such as of semiconductor nanocrystals, are actually obtained as particle size distributions.

By use of the terms "narrow wavelength band", "narrow bandwidth," or "narrow spectral linewidth" with regard to the electromagnetic radiation emission of the semiconductor nanocrystal, is meant a wavelength band of emissions not exceeding about 60 nm, preferably not exceeding about 30 nm in width, and more preferably not exceeding about 20 nm in width, and approximately symmetric about the center. It should be noted that the bandwidths referred to are determined from measurement of the full width of the emissions at half peak height (FWHM), and are appropriate in the emission range of 200 nm to 2000 nm.

By use of the term "a broad wavelength band," with regard to the excitation of the semiconductor nanocrystal, is meant absorption of radiation having a wavelength equal to, or shorter than, the wavelength of the onset radiation (the onset radiation is understood to be the longest wavelength (lowest energy) radiation capable of being absorbed by the semiconductor nanocrystal and resulting in optically radiative emission). This onset occurs near to, but at slightly higher energy than the "narrow wavelength band" of the emission. This is in contrast to the "narrow absorption band" of dye molecules, which occurs near the emission peak on the high-energy side, but drops off rapidly away from that wavelength and is often negligible at wavelengths further than 100 nm from the emission.

The term "emission peak" refers to the wavelength of light that has the highest relative intensity within the characteristic emission spectra exhibited by semiconductor nanocrystals having a particular size distribution.

The term "excitation wavelength" refers to electromagnetic energy having a shorter wavelength (higher energy) than that of the peak emission wavelength of the semiconductor nanocrystal.

Luminescent Nanoparticles:

Disclosed herein are methods for the preparation of luminescent nanoparticles that incorporate novel core-shell structures. Also disclosed herein are luminescent nanoparticles prepared by this method. While not wishing to be bound by theory, it appears that these methods facilitate the overgrowth of a high-quality, thick shell on a semiconductive core by compensating for the mismatching of lattice structures between the core and shell materials. This compensation can result in one or more of several core-shell structures proposed below. A conventional core-shell structure is depicted in FIG. 1.

In a first embodiment, a method of preparing a luminescent nanoparticle, and a luminescent nanoparticle prepared thereby, is provided. The method involves providing an isolated semiconductive core. The isolated core is admixed with a first shell precursor, a second shell precursor, a solvent and an additive as described hereinabove to form a reactive dispersion. The reactive dispersion is heated to a temperature and for a period of time sufficient to induce formation of an inorganic shell on the semiconductive core.

In one variation of this method, the additive and the solvent are added to the isolated semiconductive core prior to the addition of the first and second shell precursors. Prior to addition of the shell precursors, the core-additive-solvent admixture can be heated to suitable temperature such as between 50–300 degrees Celsius. Optionally, the step of heating to a temperature sufficient to induce shell formation may be initiated concurrently with the addition of the first and second shell precursors.

In yet another variation of this method, the solvent and the isolated semiconductive core are admixed. The mixture thus formed is admixed with the additive and the first shell precursor. Subsequently, the second shell precursor is added and the step of heating the reaction to a temperature sufficient to induce shell formation may be initiated prior to or concurrently with the addition of the second shell precursor.

In still another variation of this method, the solvent, semiconductive core and first shell precursor are admixed, followed by addition thereto of the additive and then the second shell precursor. The step of heating the reaction to a temperature sufficient to induce shell formation may be initiated prior to or concurrently with the addition of the second shell precursor.

The addition of the shell precursors and the additive may be made by dripping or rapidly injecting preformed solutions thereof into the reaction mixture.

In another embodiment, a luminescent nanoparticle is provided. The luminescent nanoparticle is comprised of a semiconductive core that is a member of a monodisperse particle population. The monodisperse particle population generally exhibits no more than about a 10% rms deviation, preferably no more than about a 5% rms deviation, in the diameter of the core. The semiconductive core is comprised of a first semiconductive material having a first lattice structure. Surrounding the semiconductive core is an inorganic shell comprised of a second inorganic material having a second lattice structure. An interfacial region is formed where the shell contacts the semiconductive core. The luminescent nanoparticle may also comprise an additive that may be present in the interfacial region alone or may be present in both the interfacial region and the shell or may be present in the core, the interfacial region, and the shell.

Compositions suitable for use as the core and shell materials for the semiconductive core and/or shell include, but are not limited to, the following: materials comprised of a first element selected from Groups 2, 12, 13 or 14 of the Periodic Table of the Elements and a second element selected from Group 16 (e.g., ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like); materials comprised of a first element selected from Group 13 of the Periodic Table of the Elements and a second element selected from Group 15 (GaN, GaP, GaAs, GaSb, InN, InP, InAs, InSb, BP, and the like); materials comprised of a Group 14 element (Ge, Si, and the like); materials such as PbS, PbSe, and the like; and alloys, solid solutions, and mixtures thereof.

The additive may be selected from the group consisting of Group 2, 12, 13, 14, 15 and 16 elements, as well as Fe, Nb, Cr, Mn, Co, Cu, and Ni, and may also be found in the semiconductive core. In one embodiment, the additive is simply a super-abundance of one of the shell precursors. The additive may be present in the interfacial region only or may be present in both the interfacial region and the shell or may be present in the core, the interfacial region, and the shell. Alternatively, the additive might not be incorporated into the nanoparticle at all, but merely facilitate overgrowth of a high-quality thick shell on a semiconductive core. When present in the shell, the additive may be uniformly distributed throughout the shell or may be distributed as a gradient, i.e., as a gradient that exhibits a decreasing concentration in an outward direction from the semiconductive core.

Figure 2:
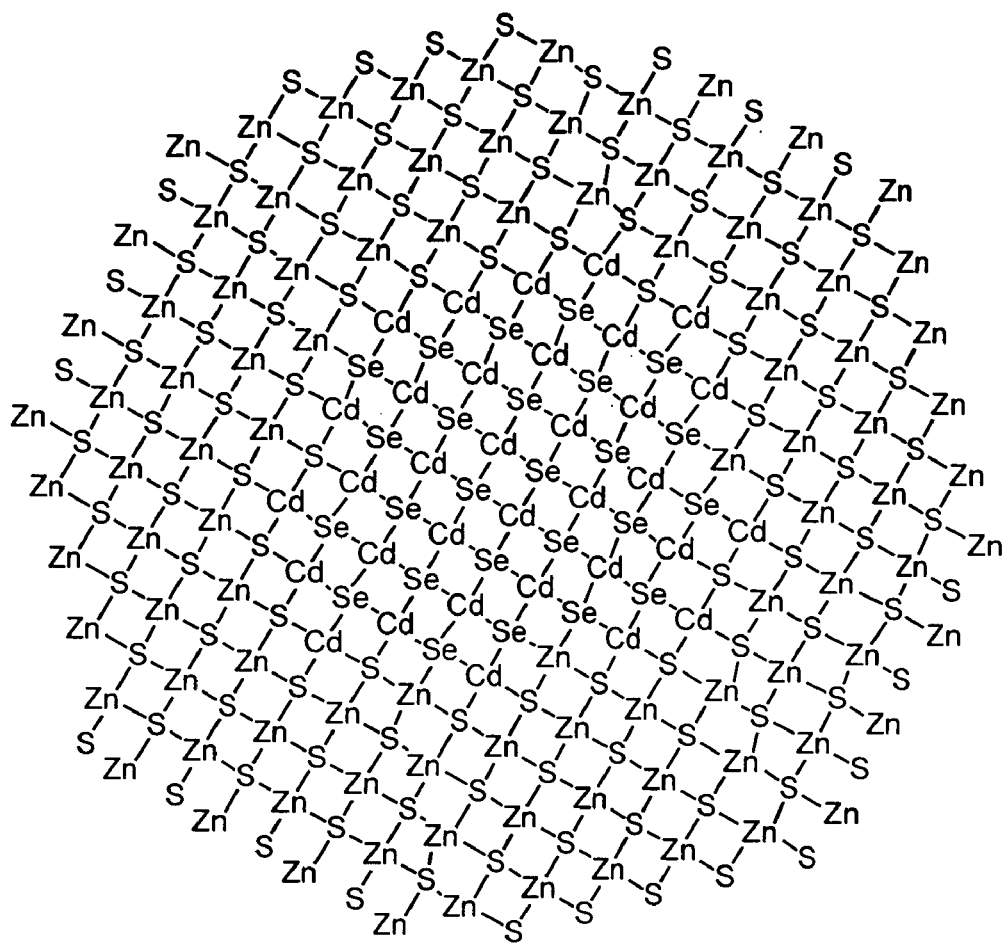
FIG. 2 depicts a simple 2-D representation of a luminescent nanoparticle in which a shell is wed to the core, with an interfacial region, which interfacial region is located between the core and the shell and may be comprised of some or all of the chemical elements in the shell and the core.

As discussed above, in one embodiment the luminescent nanoparticle comprises a core-shell structure in which the shell is wed to the semiconductive core with an interfacial region formed at the juncture of the shell and core. This interfacial region is generally in the form of a solid solution comprised of some or all of the chemical elements from the shell and the core, and also contains the additive (see FIG. 2). The interfacial region may be discontinuous, comprise a monolayer, or comprise many monolayers, and the region may incorporate several combinations of elements. For example, in a nanocrystal with a CdSe core, a Cd additive, and a ZnS outer layer, the interfacial region might include the combinations Cd/Zn/S, Cd/Se/Zn, or even Cd/Se/Zn/S. The region may also contain elements not native to either the core or shell structures. For example in the CdSe/ZnS/Cd case, small numbers of oxygen atoms might be introduced into the interfacial region during synthesis. Other elements that may be used as an additive, and which are not a first or second core precursor, or a first or second shell precursor, include Fe, Nb, Cr, Mn, Co, Cu, and Ni.

Figure 3:
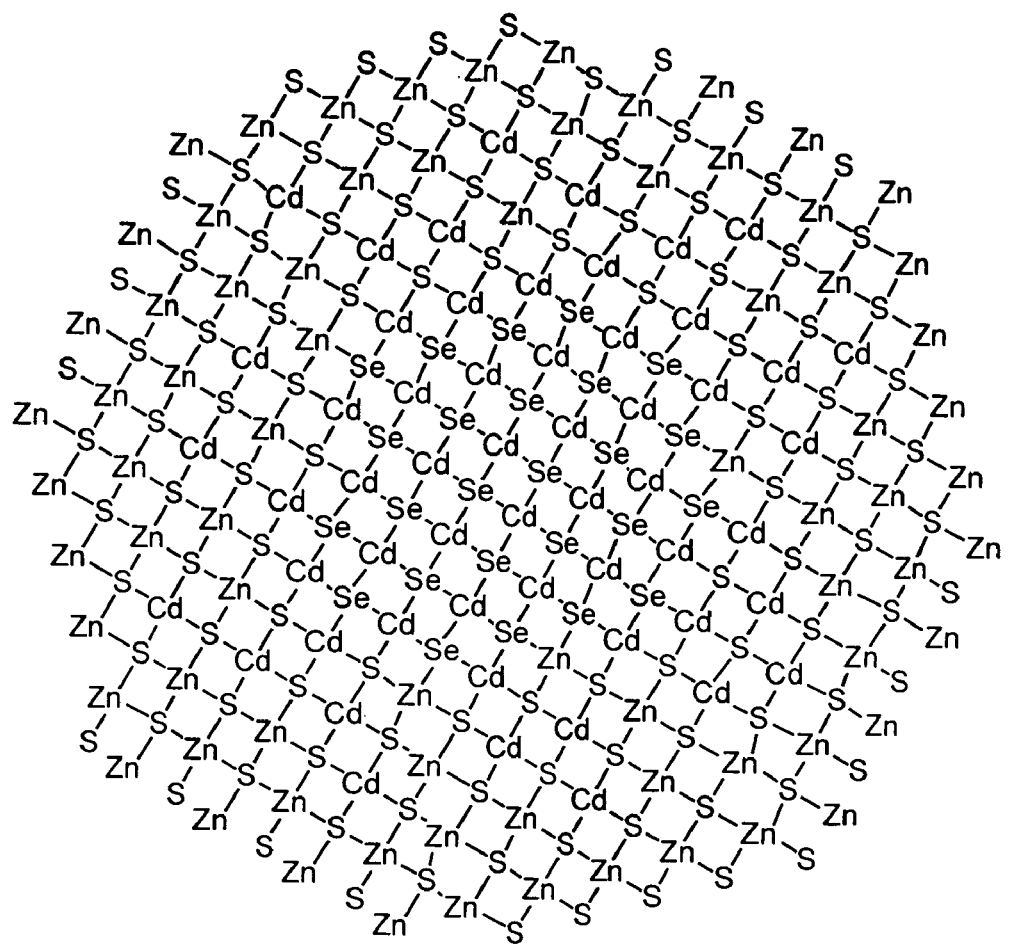
FIG. 3 depicts a simple 2-D representation of a core-shell structure in which the interfacial region and the shell takes the form of a gradient.

In another embodiment, the luminescent nanoparticle comprises a core-shell structure in which the second material and the additive are present in the form of a solid solution gradient (see FIG. 3). In the CdSe/ZnS/Cd example, the shell would contain mostly Cd and Se close to the core and mostly Zn and S close to the surface, and include a more or less smooth compositional gradient between these extremes as the distance from the semiconductive core increases.

In still another embodiment, the luminescent nanoparticle has a shell structure in which the entire (or nearly the entire) shell is itself a solid solution of the additive and the second semiconductive material. Again, in this case, the solid solution might contain several combinations of the elements in the second semiconductive material and additive, with some possible combinations not including all the elements.

Alternative theories to explain the enhanced properties of these core-shell structures exist as well. For example, the additive may become incorporated into the nanoparticle but does not act as a lattice matching agent. In this case, the enhanced properties of the resulting materials might be a result of additional electronic stabilization of the ground and/or excited states of the particle. It is also possible that the additive need not be incorporated into the particle at all. In this case, the additive may facilitate the deposition of shell material onto the underlying core in a superior form (e.g. by lowering kinetic barriers or facilitating redox chemistries).

In all of the above embodiments, the shell is generally comprised of approximately 0.1 to approximately 20 monolayers, with approximately 4 to approximately 15 monolayers being typical, and the diameter of the core is in the range of about 20 Å to about 125 Å. The diameter of the luminescent nanoparticle is in the range of approximately 1 nm to approximately 1000 nm, preferably in the range of about 2 nm to about 50 nm, and more preferably in the range of about 2 nm to about 20 nm. A monolayer is comprised of one each of a third and fourth element, where one or both may have been replaced by an additive.

When irradiated, the nanoparticle emits light in a bandwidth not exceeding about 60 nm, preferably not exceeding about 30 nm, and more preferably not exceeding about 20 nm when measured at full width at half maximum (FWHM). For CdSe, the photoluminescent quantum yield exhibited by the luminescent nanoparticle is greater than about 30%, and the narrow bandgap edge luminescence exhibited by the luminescent nanoparticle is in the spectral range of about 440 nm to about 660 nm.

Additionally, the luminescent nanoparticle may also be covered with an organic or other overcoating on the shell. The overcoating may be comprised of materials selected to provide compatibility with a suspension medium, such as a short-chain polymer terminating in a moiety having affinity for the suspending medium, and moieties that possess an affinity for the surface. Suitable overcoating materials include, but are not limited to, polystyrene, polyacrylate, or other polymers, such as polyimide, polyacrylamide, polyethylene, polyvinyl, poly-diacetylene, polyphenylene-vinylene, polypeptide, polysaccharide, polysulfone, polypyrrole, polyimidazole, polythiophene, and polyether; epoxies; silica glass; silica gel; titania; siloxane; polyphosphate; hydrogel; agarose; cellulose; and the like. The coating can be in the range of about 2 to 100 nm thick, preferably 2 to 10 nm thick.

Preparation and Synthesis:

The method described herein can be used in a systematic fashion to control the degree and nature of introduction of elements during synthesis of the semiconductive core and the inorganic shell. The method may be carried out in a single reaction vessel, i.e., in a "one-pot" synthesis, or may be carried out using separate syntheses for the semiconductive core and the inorganic shell.

Cores can be prepared by many methods. In one embodiment, they are prepared by injecting the first and second core precursors into a reaction solution held at a temperature sufficient to induce homogeneous nucleation of discrete particles. Following nucleation, the particles are allowed to grow until reaching the desired size and then quenched by dropping the reaction temperature. Other methods of semiconductor nanocrystal core production are provided in, for example (the disclosure of each of which is incorporated herein by reference): U.S. Pats. No. 6,306,736 (issued Oct. 23, 2001 to Alivisatos et al.), U.S. Pat. No. 6,225,198 (issued May 1, 2001 to Alivisatos et al.), U.S. Pat. No. 6,207,229 (issued Mar. 27, 2001 to Bawendi et al.), U.S. Pat. No. 6,048,616 (issued Apr. 11, 2000 to Gallagher et al.), U.S. Pat. No. 5,990,479 (issued Nov. 23, 1999 to Weiss et al.), U.S. Pat. No. 5,985,173 (issued Nov. 16, 1999 to Gray et al.), U.S. Pat. No. 5,690,807 (issued Nov. 25, 1997 to Clark, Jr., et al.), U.S. Pat. No. 5,505,928 (issued Apr. 9, 1996 to Alivisatos et al.), U.S. Pat. No. 5,262,357 (issued Nov. 16, 1993 to Alivisatos et al.); U.S. application Ser. No. 09/971,798, entitled "Synthesis of Colloidal Nanocrystals (published Jun. 6, 2002, as U.S. 2002-0066401, inventors Peng et al.), Ser. No. 09/751,670 entitled "Flow Synthesis of Quantum Dots" (published Jul. 4, 2002, as U.S. 2002-0083888, inventors Zehnder et al.) and Ser. No. 09/732,013 entitled "Preparation of Nanocrystallites" (published Jun. 13, 2002 as U.S. 2002-0071952, inventors Bawendi et al.); PCT Publication No. WO 99/26299 (published May 27, 1999, inventors Bawendi et al.); and Murray et al. (1993) *J. Am. Chem. Soc.* 115:8706–8715; Guzelian et al. (1996) *J. Phys. Chem.* 100:7212–7219; Peng et al. (2001) *J. Am. Chem. Soc.* 123:183–184; Hines et al. (1996) *J. Phys. Chem.* 100:468; Dabbousi et al. (1997) *J. Phys. Chem. B* 101:9463; Peng et al. (1997) *J. Am. Chem. Soc.* 119:7019; Peng et al. (1998) *J. Am. Chem. Soc.* 120:5343; and Qu et al. (2001) *Nano Lett.* 1:333–337.

Particle size and particle size distribution during the growth stage of the core reaction may be approximated by monitoring the absorption or emission peak positions and line widths of the samples. Dynamic modification of reaction parameters such as temperature and monomer concentration in response to changes in the spectra allows the tuning of these characteristics.

Cores thus prepared can be isolated using methods well known to those skilled in the art, such as flocculation with a non-solvent (e.g., methanol). Optionally, the cores thus prepared and isolated maybe subjected to an amine-treatment step prior to shell formation. Such amine treatments are disclosed by Talapin et al. (2001) *Nano Letters* 1:207 and will be well understood by those of skill in the art. Once the monodisperse particle population containing the individual semiconductive cores has been formed, the semiconductive cores may be isolated from the first solvent and then placed in a second solvent to form a core solution. Also included in the core solution can be an additive precursor.

Alternatively, the core solution can simply be comprised of the original solution in which the monodisperse population of cores is formed. Using this method, the luminescent nanoparticles can be formed in a "one pot" synthesis. The additive need only be added to the solution containing the monodisperse particle population to form the core solution. As the additive may be comprised of one of the elements of the semiconductive core, the solution containing the monodisperse particle population can be used "as is," i.e., without further purification or isolation of the thus-formed cores, once core synthesis is completed, so long as a sufficient amount of the first or second core precursor remains in the solution, e.g., excess unreacted core precursors in the proportion of at least 5% relative to amount of added core precursor, preferably unreacted core precursors in the proportion of 10% to 50% relative to the amount of added core precursor. If necessary, additional first or second precursor or other additive can be added.

The core solution is then heated to a temperature sufficient to induce shell formation, and first and second shell precursors, are injected. The temperature at which the shell is formed on the semiconductive core is related to the quality of the resultant nanoparticle. Shell formation at relatively higher temperatures may cause the individual cores to begin to grow via Ostwald ripening, with resulting deterioration of the size distribution of the particles, leading to broader spectral line widths. Formation of the shell at relatively low temperatures could lead to incomplete decomposition of the precursors or to reduced integrity of the lattice structure of the shell. Typical temperatures for forming the shell range from about 100° C. to about 300° C. The actual temperature range may vary, depending upon the relative stability of the precursors and the semiconductive core. Preparation of a core-shell luminescent nanocrystal is disclosed in, e.g., U.S. Pat. No. 6,207,229 to Bawendi et al.

The concentrations of the additive precursor and the first and second shell precursors, and the rate of the addition of these precursors to the core solution, are selected to promote heterogeneous growth of the shell onto the semiconductive core rather than homogeneous nucleation, to produce semiconductive cores comprised of elements of the first and second shell precursors. Conditions favoring heterogeneous growth include dropwise addition, e.g., 1–2 drops/second, of solutions containing the first and second shell precursors to the core solution, and maintenance of the precursors at low concentrations. Low concentrations typically range from 0.0005–0.5 M. In this manner, a shell is formed over the semiconductive core with an interfacial region formed between the semiconductive core and shell.

The interfacial region wherein the semiconductive core and shell meet may contain elements of both the shell and core and of the additive. While not wishing to be bound by theory, it is believed that by incorporating such an additive into at least the interfacial region of the luminescent nanoparticles, stresses in the core-shell interface caused by the differences in the lattice structures of the core and shell may be reduced. Reduction of these stresses would serve to greatly improve the strength and uniformity of the core-shell composite.

Many chemical forms of the core and shell precursors can be used in the method of the invention. For example, organometallic precursors such as $Me_2Cd$ may be used, as may oxides, such as CdO, or salts, such as $CdCl_2$, $Cd(acetoacetonate)_2$, $Cd(acetate)_2$, and $Cd(NO_3)_2$. Other suitable precursors include elemental precursors such as elemental Se, tri-alkylphosphine adducts, protic compounds such as $H_2Se$ or NaHSe. Suitable organometallic precursors are disclosed in U.S. Pat. Nos. 6,322,901 and 6,207,229 to Bawendi et al., and synthesis methods using weak acids as precursor materials are disclosed in Qu et al., (2001) "Alternative Routes toward High Quality CdSe Nanocrystals," *Nano Lett.*, 1(6):333–337, U.S. application Ser. No. 09/971,798, entitled "Synthesis of Colloidal Nanocrystals (published Jun. 6, 2002, as U.S. 2002-0066401, inventors Peng et al.), and Ser. No. 09/732,013 entitled "Preparation of Nanocrystallites" (published Jun. 13, 2002 as U.S. 2002-0071952, inventors Bawendi et al.

Thus, suitable chemical forms for use as any one of the first and second core precursors, first and second shell precursors, or additive precursors include, but are not limited to, Group 16 elements; trialkylphosphines of Group 16 elements (such as tri-n-butylphosphine substituted Se); bis-trialkylsilyl substituted Group 16 elements (such as bis (trimethylsilyl)selenide); and mixtures thereof; Group 2, 12, and 14 metal oxides; $C_{1-4}$ alkyl substituted Group 2, 12, 13, and 14 metals; Group 2, 12, and 13 metal salts of weak acids, such as acetates and carbonates; and Group 2, 12, 13, and 14 metals; and mixtures thereof.

Suitable first and second solvents may be selected from the group consisting of acids (particularly fatty acids), amines, phosphines, phosphine oxides, phosphonic acids (and phosphoramides, phosphates, phosphates, etc.), and mixtures thereof. Other solvents, including alkanes, alkenes, halo-alkanes, ethers, alcohols, ketones, esters, and the like, are also useful in this regard, particularly in the presence of added nanoparticle ligands. It is to be understood that the first and second solvents may be the same and, in "one pot"-type synthesis, may comprise the same solution. Preferred acids include, but are not limited to, stearic and lauric acids. Suitable amines include, but are not limited to, alkylamines such a dodecylamine. Preferred phosphines include, but are not limited to, trioctylphosphine; preferred phosphine oxides include, but are not limited to, trioctylphosphine oxide; and preferred phosphonic acids include, but are not limited to, tetradecylphosphonic acid. It will be understood that the solvents may comprise a mixture of any of the above solvents.

In the "one pot" method, "carry-over" precursors from the semiconductive core synthesis can be used as the additive material during shell formation. Many core-forming reactions can be conducted in such a fashion that they do not proceed to completion. Other core-forming reactions are conducted in the presence of excess reagents. Cores formed under these conditions can be added to a shell formation reaction without isolation and purification, along with the carry-over excess and/or unreacted precursors. In fact, it has been observed that the formation of materials with particularly thick shells, unique morphologies, and surprising photophysical properties result when overcoating procedures are conducted using unpurified solutions from low (particle) yielding core reactions that contain excess unreacted precursors in the proportion of at least 5% relative to amount of added precursor. Preferably unreacted precursors are in the proportion of 10% to 50% relative to the amount of added precursor. Furthermore, an additive, which may be the same or different than the carry-over precursor(s), can be combined with the cores to augment the carry-over amounts.

Figure 4:
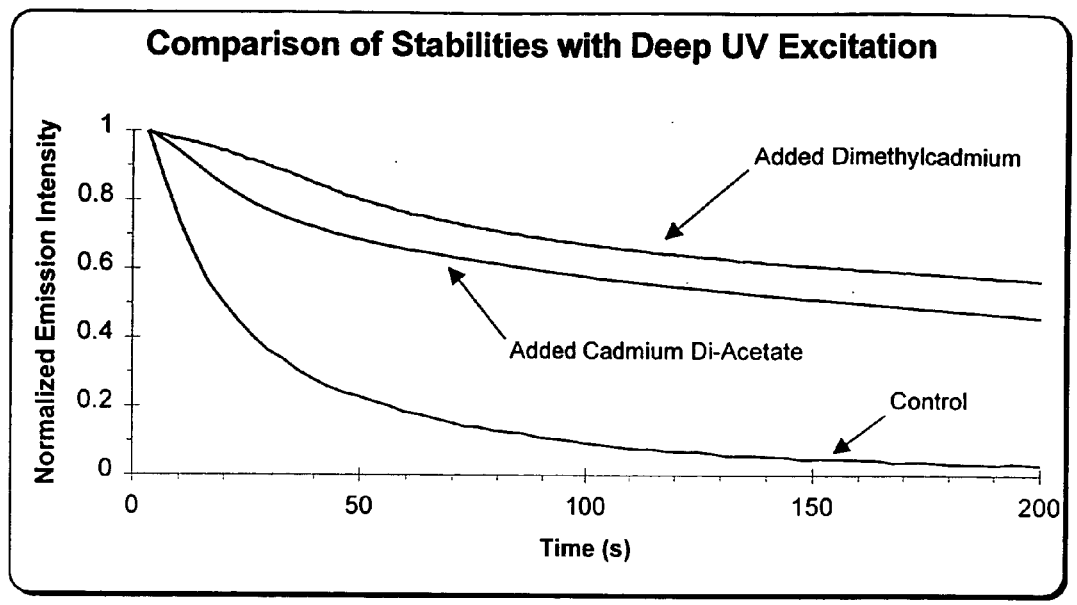
FIG. 4 depicts photo-decay curves for standard core-shell nanocrystals compared to those of comparably emitting materials prepared by the method disclosed herein.

The method described herein allows the addition of a shell of predetermined thickness (limited only by the dispersability of the final particles). This invention also provides a method to prepare particularly stable (inert) materials that are substantially less environmentally sensitive (e.g., reduced sensitivity to the presence of methanol as a quencher). Depicted in FIG. 4 are photo-decay curves for standard core-shell nanocrystals compared to those for comparably emitting materials prepared by the method disclosed herein.

The present invention provides additional advantages over previous methods of preparing a core-shell structure. Since the shell resulting from previous synthetic methods does not appear to electronically insulate the core completely, excited electrons and/or holes can tunnel into the shell layer in core-shell nanocrystals. This leads to a red shift in the core-shell emission relative to core emission energies. This process is typically not well controlled. In general, greater shifts are seen with the smaller particles and minimal or no shifts are seen with the larger particles. This method described herein adds an additional degree of control to the process, allowing large shifts with large or small particles, thus facilitating color tuning. A related advantage of the present invention arises from the fact that this method results in core-shell nanoparticles having substantially narrower emission spectra than those produced by previous methods. Furthermore, modification of core-shell nanocrystal surfaces with organic or biological ligands represents a major scientific challenge; the ability to incorporate additive elements in the shell provides another means of modulating important surface-to-ligand interactions. Finally, it is likely that such modifications to the shell will allow the preparation of materials with attenuated emission intermittency behavior.

It is to be understood that while the invention has been described in conjunction with the preferred specific embodiments thereof, the foregoing description as well as the examples that follow are intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entirety.

The practice of the present invention will employ, unless otherwise indicated, conventional techniques of synthetic inorganic and organic chemistry, and the like, which are within the skill of the art. Such techniques are explained fully in the literature. See, e.g., Kirk-Othmer's *Encyclopedia of Chemical Technology*; and House's *Modern Synthetic Reactions*.

EXPERIMENTAL

The following examples are put forth so as to provide those of ordinary skill in the art with a complete disclosure and description of how to prepare and use the compositions disclosed and claimed herein. Efforts have been made to ensure accuracy with respect to numbers (e.g., amounts, temperatures, rates, times, etc.) but some errors and deviations should be accounted for. Unless indicated otherwise, parts are parts by weight, temperature is in degrees Celsius (° C.), and pressure is at or near atmospheric. Additionally, all starting materials were obtained commercially or synthesized using known procedures. In all the following examples, materials were obtained as follows: tri-n-octylphosphine (TOP) and bis(trimethylsilyl)sulfide were from Fluka; Tri-n-octylphosphine oxide (TOPO) (90%) was from Alfa Aesar; dimethylcadmium, diethylzinc, and elemental selenium were from Strem; cadmium di-acetate (anhydrous) was from Prochem; and tetradecylphosphonic acid (TDPA) was obtained from J. Chem.

EXAMPLE 1

Preparation of Core-Shell Nanocrystals Using Added Dimethylcadmium

Tri-n-octylphosphine oxide (TOPO, 30 g) was degassed for 1 hr under vacuum at 180° C. in a 3-neck round bottom flask containing a stir bar on a heating mantle, and equipped with a bump trap and a thermocouple (and temperature controller). The molten reaction was placed under a dry $N_2$ atmosphere and heated to 350° C. Inside an inert atmosphere glove box, Se (360 mg) was combined with dimethylcadmium (230 μL) in tri-n-octylphosphine (TOP, 20 mL). In a single rapid injection, the TOP solution was added to the hot TOPO pot after removing the heat from the reaction. After injection, the temperature fell to 265° C., and it was heated to 290° C. An increasing temperature ramp of +1° C./hr was applied to the reaction for 6.5 hr until the emission maximum of the particles reached 608 nm. The reaction was cooled to 100° C. Decylamine (11 mL) was added via syringe and heating maintained overnight.

Using a similar reaction apparatus, a second portion of TOPO (15 g) was degassed under vacuum at 180° C. for 3 hr, then placed under $N_2$ and cooled to 60° C. A portion of the stirring CdSe core reaction (3.4 mL) was transferred to this new reaction along with 1 mL of a dimethylcadmium stock solution (120 μL in 10 mL TOP). The reaction was heated to 215° C. An overcoating stock solution consisting of diethylzinc (208 mg), bis(trimethylsilyl)sulfide (300 mg), and TOP (12.3 g) was dripped into the reaction over the course of ~1 hr. Following addition of the stock, heating was continued at 215° C. for 10 min. Finally, the reaction was cooled to 90° C. and allowed to stir overnight. The overcoating reaction was also carried out in the absence of the dimethylcadmium stock solution for purposes of comparison.

TEM analysis of the two samples showed that the addition of dimethylcadmium to the reaction allowed the growth of shells that were approximately 5 monolayers thick compared to 1.5 monolayers for the control (no added dimethylcadmium) reaction. In agreement with this observation, an emission shift upon addition of the shell to the CdSe cores of 19 nm was observed, compared to 6 nm in the control experiment. Photostability under deep UV irradiation at 254 nm was also compared, and the cadmium-containing material was found to be substantially more photo-inert. A significant narrowing in the emission spectra (relative to the bare cores) was also observed.

EXAMPLE 2

Preparation of Core-Shell Nanocrystals Using Added Cadmium Diacetate

Nanocrystals were prepared in a manner similar to that described Example 1, except that the dimethylcadmium/TOP solution in the shell overcoating procedure was replaced with a cadmium di-acetate/TOP solution. A 0.25 mL of a 0.67 M solution of the cadmium di-acetate/TOP solution was used. The resultant overcoated nanocrystals displayed a similar shell thickness as those prepared in Example 1. Photostabilities were also comparable.

EXAMPLE 3

Figure 5:
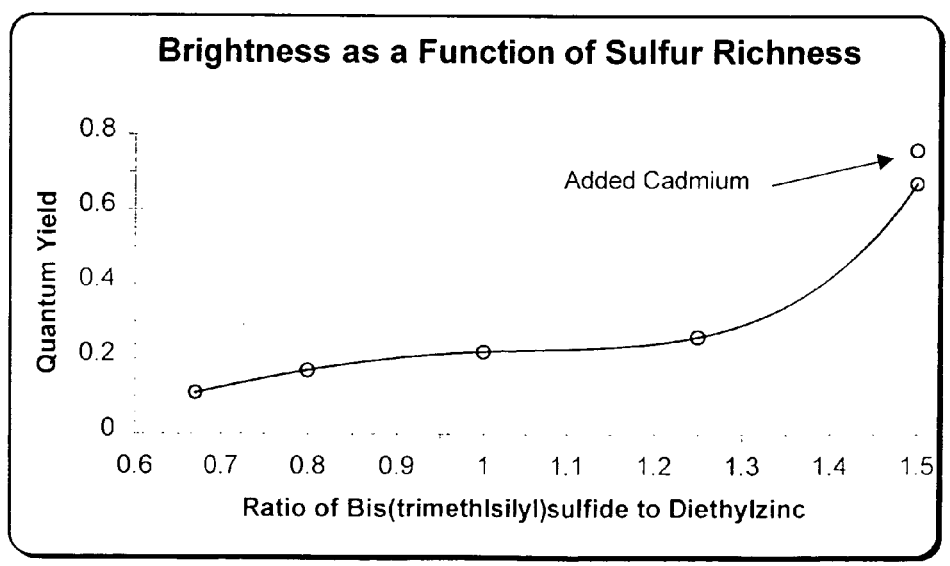
FIG. 5 depicts core-shell brightness as a function of sulfur added to the standard shell reaction.
Figure 6:
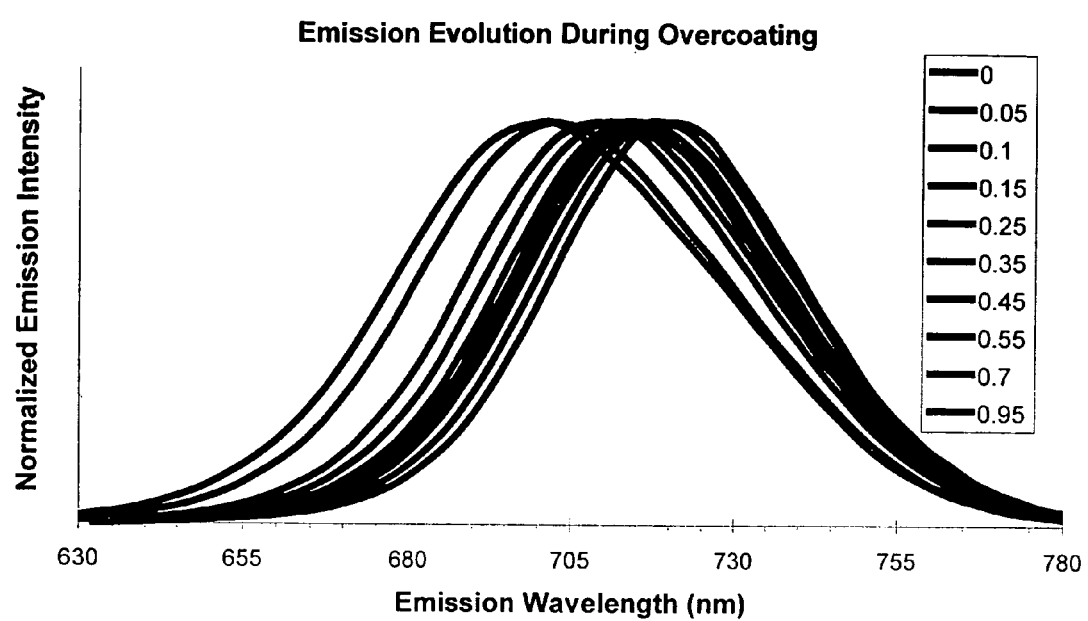
FIG. 6 depicts a plot of the evolution of emission as a function of stock solution addition for the luminescent nanocrystals prepared in Example 5.

Preparation of Core-Shell Nanocrystals Using Super-Abundances of Shell Precursors as Additives The core reaction was carried out as described in Example 1, with the exception that the reaction was stopped when the peak emission of the nanoparticles reached 622 nm rather than 608 nm. No dimethylcadmium or cadmium di-acetate was added to the shell reaction. The shell stock solution contained TOP (6.3 g), diethylzinc (206 mg), and bis(trimethylsilyl)sulfide (450 mg). Shell reactions were conducted containing the S:Zn precursor ratios indicated in FIG. 5. In addition, a control reaction was conducted in which a 1:1 molar ratio of S and Zn precursors was used. Shell thickness and particle morphology were evaluated for all S:Zn precursor ratios. A dramatic difference was found in the brightness of the particles: emission quantum yields of 0.76 and 0.22 were measured for the 1.5:1 S precursor:Zn precursor molar ratio reaction and the control reaction, respectively (see FIG. 5)

EXAMPLE 4

Cores and Modified Shells Using Only Ionic Precursors

CdSe Core Synthesis:

A first precursor solution of selenium was prepared by dissolving 0.79 g Se in 10 mL of TBP (tri-n-butylphosphine). A second precursor solution of cadmium was prepared by dissolving 5.76 g anhydrous cadmium acetate in TOP to a final weight of 50 g.

In a round bottom flask, 21 g TOPO (>95% purity) was combined with 7.09 g cadmium acetate/TOP second precursor solution, 1.97 g tetradecylphosphonic acid and 5.47 mL TOP and heated to 250° C., while sparging with $N_2$. Once the temperature reached 250° C., sparging was stopped, the temperature was increased to 270° C. and held at this temperature for 20 minutes. Stirring of the solution was maintained throughout. Next, 7 mL TBP (99% purity) was injected, causing a temperature drop. The temperature controller was set to 290° C. When the temperature recovered to 270° C., 4.96 mL of the previously prepared TBP:Se first precursor solution was rapidly injected. The reaction was stopped by cooling. The final emission peak was at 569 nm with a full-width at half height (FWHM) of 26 nm.

ZnS Shell Synthesis:

10 mL of the above-prepared CdSe particles ("cores") were flocculated with 20 mL of 75% methanol/25% isopropanol (v/v). After centrifugation, the cores were redispersed in 5 mL hexanes.

3 g TOPO was degassed for one hour at 180° C. under vacuum in a round bottom flask. 3 mL TOP and 2 mL TBP were added to the degassed TOPO. The dispersion of cores in hexanes was added and the hexanes removed under vacuum at 30–60° C. Next, 2.5 mL decylamine was added and the combined solution was held at 100° C. overnight.

2 g of the previously prepared cadmium acetate/TOP second precursor solution was combined in a round bottom flask with 2.6 mL TOP and 0.557 g TDPA. The mixture was heated to 250° C. then cooled to 60° C. 2 mL of this mixture was added to the amine treated cores.

A third precursor solution was made by combining 4 g TOP, 53 mg diethylzinc, and 76 mg bis-trimethylsilyl sulfide.

4 g TOPO (tech grade) was degassed in a round bottom flask for three hours at 180° C. under vacuum. 11 mL of the cadmium-spiked, decylamine-treated cores were added to this flask. The flask was heated to 215° C. The third precursor stock solution was added to the flask containing the cores at a rate of 20 µL/min. Following addition, the flask was allowed to cool and 10 mL toluene was added prior to storage.

Final emission peak was at 607 nm with a full-width at half height (FWHM) of 23 nm. Quantum yield (relative to 95% standard Rhodamine 101) was 53%.

EXAMPLE 5

CdTe/ZnS Core-Shell Structures

Preparation of CdTe Cores:

TDPA (0.56 g), TOPO (5.00 g), and a small Teflon-coated stir bar were placed in a three-neck round bottom flask. The flask was clamped in place in a 60 W heating mantle, on a magnetic stir plate and equipped with a white rubber septum, a condenser connected to a vacuum-nitrogen manifold, and a thermocouple connected to a temperature controller. The reactor was evacuated and backfilled with nitrogen three times and heated to 100° C. with stirring under vacuum, where it was held for 3 hours. The vessel was backfilled with nitrogen and a nitrogen blanket was maintained. By syringe, cadmium acetate in TOP (0.5 m, 2.00 g) was added through the septum. Two 18-gauge needles were inserted into the septum, and the temperature was increased to 320° C. while the reactor was sparged with nitrogen. The two needles were removed at 250° C. Ten minutes after the temperature first hit 310° C., TOP:Te in TOP (1.75 m, 0.86 g) was added by syringe. The heating mantle was removed after 4.25 minutes, and the reaction was allowed to cool. When the reaction had cooled to 100° C., toluene (4.8 mL) was added. With stirring, methanol (14.5 mL) was added and the flocculated cores were isolated by centrifugation. The cores were rinsed with 5 mL methanol and allowed to air dry. Hexanes (14 mL) were added to disperse the cores.

Preparation of CdTe/ZnS Core-Shells:

CdTe cores dispersed in hexanes (3.5 mL) were added to a three-neck round bottom flask containing TOPO (5.00 g). The flask was fitted with a 6-inch condenser connected to a vacuum-nitrogen manifold, a white rubber septum, and a thermocouple connected to a temperature controller. The hexanes were removed under vacuum without heating, allowing the temperature to drop below room temperature. Once evacuated, the reaction was heated to 100° C. and maintained for 90 minutes. After switching to nitrogen, TOP (2.50 g) and decylamine (4.35 mL) were added. The reaction was maintained at 100° C. overnight. TDPA (0.336 g) was placed in a 25 mL three-neck round bottom flask fitted with a rubber septum, a vacuum-nitrogen manifold connection, and a thermocouple connected to a temperature controller. The reactor was evacuated and backfilled with nitrogen three times. Cadmium acetate in TOP (0.5 m, 1.21 g) and TOP (1.30 g) were added under nitrogen and the reaction was heated to 250° C., and subsequently cooled to 100° C. The hot liquid was transferred to the cores. With mixing, diethylzinc (0.075 g) was added to a vial containing TOP (0.50 g). To this mixture, and bis(trimethylsilyl)sulfide (0.108 g) was added with mixing. The vial was swirled to mix the contents, which were transferred to a syringe. The CdTe core solution was heated to 215° C. and the zinc/sulfur/TOP solution was added at 1 mL/hr. At the end, the temperature was dropped to 90° C. where it was maintained for 1 day. A plot of the evolution of emission as a function of stock solution addition is presented as FIG. 5.

In this example, cadmium (in the form of a salt) was used as an additive in the Zn/S shell overcoating reaction. Tellurium could be added instead (likely in the form of a TOP adduct), to provide another example of an element from the underlying core being added to the shell. In addition, selenium (potentially as an adduct with TOP) could be used instead of cadmium or tellurium. Even though selenium is not native to either the core or the shell, it is intermediate between sulfur and tellurium in properties and is therefore a promising candidate as well.

EXAMPLE 6

Cores Made from Cd(II) Precursor with a Shell: Use of Component of the Core Reaction as the Additive Core Synthesis:

A first precursor solution of selenium (Se) was prepared by dissolving 0.79 g Se in 10 ml of TBP. A second precursor solution of cadmium was prepared by dissolving 6.15 g anhydrous cadmium acetate in TOP to a final volume of 40 mL.

In a round-bottom flask, 3 g TOPO (>95% purity) was combined with 0.76 mL cadmium acetate/TOP second precursor solution, 0.282 g TDPA and 1.24 ml TOP and heated to 250° C., while sparging with $N_2$. Once the temperature reached 250° C., sparging was stopped, the temperature was increased to 270° C. and held at this temperature for 20 minutes. Stirring of the solution was maintained throughout. Next, 1 ml TBP (99% purity) was injected, causing a temperature drop. The temperature controller was then set to 290° C. When the temperature recovered to 270° C., 0.71 mL of the previously prepared TBP:Se first precursor solution was rapidly injected. Eleven minutes after the TBP:Se was injected, the reaction was stopped by removing the heat source to form a core dispersion. The final emission peak of the cores in the core dispersion was at 582 nm with a full-width at half height (FWHM) of 25 nm.

Shell Synthesis:

2.0 mL decylamine was added to the core dispersion. The decylamine/core dispersion thus formed was held at 100° C. overnight. 11 g TOPO (Alfa, tech grade) was degassed for one hour at 180° C. under vacuum in a round bottom flask. 3 ml of decylamine/core dispersion was added to the TOPO to form a TOPO/decylamine/core dispersion. The flask was heated to 200° C. A shell precursor stock solution was made by combining 5.0 g TOP, 30 mg diethylzinc and 43 mg bis-trimethylsilyl sulfide. 2.9 mL of the shell precursor stock was added to the TOPO/decylamine/core dispersion at a rate of 100 µl per minute. The flask was then allowed to cool and toluene was added prior to storage of the core-shell dispersion thus formed.

Final emission peak of the core-shells was at 605 nm with an FWHM of 21 nm. Quantum yield (relative to Rhodamine 101) was 40%.

We claim:

1. A luminescent nanoparticle prepared according to the method comprising the steps of:
   a. preparing a semiconductive core according to a method comprising adding a first amount of a first core precursor and a first amount of a second core precursor to form a reaction solution and reacting the first core precursor with the second core precursor under conditions which result in the formation of the semiconductive core and the presence of an amount of a first additive comprising unreacted first core precursor, second core precursor, or both the first and second core precursors in the reaction solution;
   b. heating the core to a temperature sufficient to induce formation of an inorganic shell on the core upon addition thereto of the shell precursors;
   c. admixing with the reaction solution a first shell precursor and a second shell precursor to form a reaction dispersion; and
   d. maintaining the reaction dispersion at a temperature for a period of time sufficient to induce formation of an inorganic shell on the semiconductive core.

2. The nanoparticle in claim 1, wherein a second additive is combined with the reaction solution prior to or during step (b).

3. The nanoparticle in claim 2, wherein the second additive is a second amount of the first core precursor, the second precursor or both the first and second core precursors.

4. The nanoparticle in claim 2, wherein the second amount of the second additive is in the proportion of at least 5% of the amount of the added first core precursor, the second core precursor or both the first or second core precursors.

5. The nanopartiele of claim 2, wherein the second additive is selected from a Group 2 element, a Group 12 element, a Group 13 element, a Group 14 element, a Group 15 element, a Group 16 element, Fe, Nb, Cr, Mn, Co, Cu, and Ni.

6. The nanoparticle of claim 2, wherein the first and second additives are the same or different.

7. The nanoparticle of claim 1, wherein the step of heating the core comprises heating the core to a temperature of about 50° C. to about 300° C.

8. A luminescent nanoparticle prepared according to a method comprising the steps of:
   a. providing a semiconductive core;
   b. heating the core to a temperature sufficient to induce formation of an inorganic shell on the core upon addition thereto of shell precursors;
   c. admixing with the core
      i. a first shell precursor,
      ii. a second shell precursor,
      iii. a solvent and iv. an additive comprising an element selected from the group consisting of a Group 2 element, a Group 12 element, a Group 13 element, a Group 14 element, a Group 15 element, a Group 16 element, Fe, Nb, Cr, Mn, Co, Cu, and Ni, to form a reaction dispersion; and
   d. maintaining the temperature of the reaction dispersion at a temperature for a period of time sufficient to form an inorganic shell on the semiconductive core.

9. The nanoparticle of claim 8, wherein the semiconductive core comprises a material selected from the group consisting of:
   a. a first element selected from Groups 2, 12, 13, or 14 and a second element selected from Group 16;
   b. a first element selected from Group 13 and a second element selected from Group 15;
   c. a Group 14 element; and d) ternary and quaternary mixtures, compounds, and solid solutions thereof.

10. The nanoparticle of claim 9, wherein the semiconductive core comprises a material selected from the group consisting of MgS, MgSe, MgTe, CaS, CaSe, CaTe, SrS, SrSe, SrTe, BaS, BaSe, BaTe, ZnS, ZnSe, ZnTe, CdS, CdSe, CdTe, HgS, HgSe, HgTe, $Al_2S_3$, $Al_2Se_3$, $Al_2Te_3$, $Ga_2S_3$, $Ga_2Se_3$, $Ga_2Te_3$, $In_2S_3$, $In_2Se_3$, $In_2Te_3$, SnS, SnSe, SnTe, PbS, PbSe, PbTe, AlP, AlAs, AlSb, GaN, GaP, GaAs, GaSb, InN, InP, InAs, InSb, BP, Si, and Ge, and ternary and quaternary mixtures, compounds, and solid solutions thereof.

11. The nanoparticle of claim 10, wherein the semiconductive core comprises a material selected from the group consisting of CdSe, CdTe, CdS, ZnSe, InP, InAs, and PbSe, and ternary and quaternary mixtures, compounds, and solid solutions thereof.

12. The nanoparticle of claim 8, wherein the inorganic shell comprises a material selected from the group consisting of:
  a. a first element selected from Groups 2, 12, 13, or 14 and a second element selected from Group 16;
  b. a first element selected from Group 13 and a second element selected from Group 15; and
  c. a Group 14 element.

13. The nanoparticle of claim 12, wherein the inorganic shell comprises a material selected from the group consisting of MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, $Al_2O_3$, $Al_2S_3$, Al2Se3, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, SnO, $SnO_2$, SnS, SnSe, SnTe, PbO, $PbO_2$, PbS, PbSe, PbTe, AlN, AlP, AlAs, AlSb, GaN, GaP, GaAs, GaSb, InN, BP, and ternary and quaternary mixtures, compounds, and solid solutions thereof.

14. The nanoparticle of claim 13, wherein the inorganic shell comprises a material selected from the group consisting of CdSe, CdS, ZnSe, ZnS, CdO, ZnO, $SiO_2$, $Al_2O_3$, and ZnTe.

15. The nanoparticle of claim 8, wherein the semiconductive core comprises a material selected from the group consisting of CdSe, CdTe, CdS, ZnSe, InP, InAs, and PbSe and wherein the inorganic shell is selected from the group consisting of CdSe, CdS, ZnSe, ZnS, CdO, ZnO, $SiO_2$, $Al_2O_3$, and ZnTe, and ternary and quaternary mixtures, compounds, and solid solutions thereof.

16. The nanoparticle of claim 8, wherein the semiconductive core is CdSe or CdTe, the inorganic shell is ZnS and the additive is Cd, or the inorganic shell is CdS and the additive is Zn.

17. The nanoparticle of claim 8, wherein the step of heating the core comprises heating the core to a temperature of about 50° C. to about 300° C.

18. A method of preparing a luminescent nanoparticle comprising the steps of:
  a. preparing a semiconductive core according to a method comprising adding a first amount of a first core precursor and a first amount of a second core precursor to form a reaction solution and reacting the first core precursor with the second core precursor under conditions which result in the formation of the semiconductive core and the presence of an amount of a first additive comprising unreacted first core precursor, second core precursor, or both the first and second core precursors in the reaction solution;
  b. heating the core to a temperature sufficient to induce formation of an inorganic shell on the core upon addition thereto of the shell precursors;
  c. admixing with the reaction solution a first shell precursor and a second shell precursor to form a reaction dispersion; and
  d. maintaining the reaction dispersion at a temperature for a period of time sufficient to induce formation of an inorganic shell on the semiconductive core.

19. The method of claim 18, wherein a second additive is combined with the reaction solution prior to or during step (c).

20. The method of claim 18, wherein the step of heating the core comprises heating the core to a temperature of about 50° C. to about 300° C.

* * * * *